UNITED STATES PATENT OFFICE.

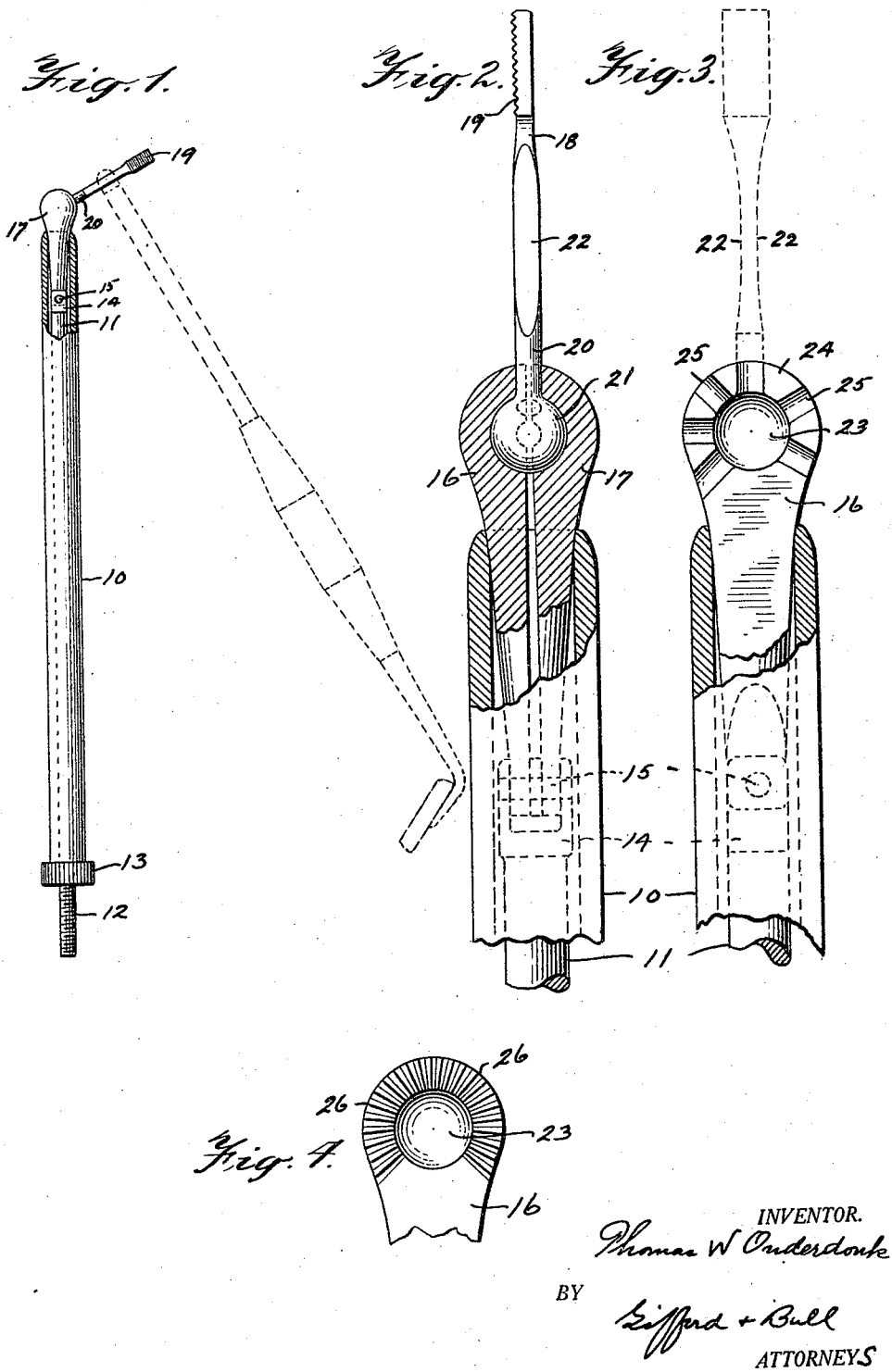

THOMAS W. ONDERDONK, OF NEW YORK, N. Y.

DENTAL SCALER.

1,412,130. Specification of Letters Patent. Patented Apr. 11, 1922.

Application filed August 20, 1921. Serial No. 493,893.

*To all whom it may concern:*

Be it known that I, THOMAS W. ONDERDONK, a citizen of the United States, residing at New York city, in the county of New York and State of New York, have invented certain new and useful Improvements in Dental Scalers, of which the following is a specification.

My present invention relates to dental instruments, particularly dental scalers used for cleaning pyorrhea pockets around teeth, although certain features of my invention may be applied to dental instruments used for other purposes.

My invention will best be understood from the following description and drawings, in which Figure 1 shows an illustrative form of a dental scaler embodying my invention; Fig. 2 an enlarged side elevation, partly in section, of the instrument shown in Fig. 1; Fig. 3 a side view of Fig. 2 with some of the parts removed, and Fig. 4 a fragmentary view showing a modification.

In the several views the same reference characters refer to the same parts.

In the illustrative form of my invention, the device is made up of the tool and a handle therefor, the parts being arranged so that the tool may be adjusted in various positions in the handle in the manner to be described hereinafter. The handle, in the form illustrated, comprises a tube 10 through which extends a rod 11 having a threaded portion 12 at its lower end engaged by a nut 13 contacting with the lower end of the tube 10.

At the opposite end of the rod 11 is a head 14 through which projects a pin 15 on which is mounted a pair of clamping jaws 16, 17. The lower portions or necks of these jaws are made tapering and the upper end of the tube 10 is also tapered, so that when the nut 13 is turned to draw the rod 11 downward in the tube 10, the jaws 16, 17 are drawn into the tube 10 to force the jaws together.

The scaler tool which I have adopted for purposes of illustration, has a shank or body portion 18 which has at one end a working face 19, in the form illustrated, this working face being made up of a series of file-like teeth. At the lower end of the shank 18 is a cylindrical portion 20 and a ball 21. For certain purposes, to be pointed out hereinafter, preferably, I flatten the shank 18, as at 22. The working face 19 extends substantially parallel to the axis of the shank 18 and of the cylindrical portion 20.

The jaws 16, 17, in the illustrative form, are provided with a pair of opposed hemispherical recesses 23 adapted to receive the ball 21 on the end of the tool. These jaws are also provided with opposed gripping faces 24 which are substantially circular, and which preferably are provided with a plurality of radial recesses 25 arranged to receive the cylindrical portion 20 of the tool. As many of these recesses 25 as are desired may be formed in the faces 24.

Instead of forming these definite recesses 25 each capable of enclosing substantially one-half of the cylindrical portion 20, I may provide the faces 24 with a series of radial notches 26, as shown in Fig. 4.

With the parts in the position shown in Figs. 2 and 3, it will be obvious that when the rod 11 is drawn downward in the tube 10, the jaws 16, 17 will clamp the cylindrical portion 20 to grip the tool frictionally. If desired, the recess 23 may also be formed so that it will aid in this gripping action, although this is not essential, reliance in such case being placed on the gripping effect around the cylindrical portion only. Obviously, by opening the jaws, the tool may be set in any one of the recesses 25, or in any one of the notches 26, when the latter construction is used. This will change the angle of the axis of the tool in relation to the handle 10. Furthermore, by reason of the frictional grip on the tool and the relation of the working face 19 to the axis thereof, it will also be apparent that by turning the tool on the axis of the cylindrical portion 20, the plane of the working face 19 may be rotated around the axis of the tool, so that such plane can be brought into any desired relation to the handle 10. Such rotation will preferably be caused by engaging the tool with some sort of a holder, such as the handle of the usual dental mirror, as illustrated in dotted lines in Fig. 1, and the flattened portions 22, 22 are provided for this purpose.

In use, the operator will set the tool in a desired position, such as that illustrated in Fig. 1, and will clamp it there. Then as he works around the pyorrhea cavity and finds it desirable to change the angle of the working face of the handle 10, he may, without removing the mirror from the patient's mouth, engage the tool with the end of the mirror handle and rotate it against the friction of the jaws 16, 17 to the new desired position. In other words, the frictional pressure from the jaws 16, 17 is sufficient to hold the tool in working position, but this friction can be overcome by the use of a holder engaging the tool, so that the plane of the working face in relation to the axis of the handle 10 can be readily adjusted without disturbing the clamps for the tool.

Preferably, I provide the ball 21, but any other form of enlargement of the end of the tool will be sufficient to prevent the tool from dropping out of the jaws when the latter are opened, so that the tool may be moved from one of the slots 25 to another, and also to insure that in working in a patient's mouth, the tool will not be drawn lengthwise out of the clamping jaws.

While I have shown flattened parts of the shank as a ready means by which the tool may be engaged and rotated on its axis, it will be understood that such flattened parts are not necessary, and that the tool may be rotated by engagement with any other portion or by any means other than the slot in the end of the handle of the dental mirror, which I prefer.

It will also be understood that while my invention relates primarily to dental scalers, it may be used in connection with any other form of instrument in which it is desirable to bring a relatively flat working face into substantially any desirable relation to the handle.

I claim:—

1. A dental scaler comprising a tool having a cylindrical portion, and a working face extending substantially parallel to the axis of the cylindrical portion, and a handle having means to grip said cylindrical portion and hold the tool in operative position frictionally, said tool having a portion adapted to be engaged by a holder, whereby the tool may be rotated on the axis of the cylindrical portion while gripped in the handle.

2. A dental instrument comprising a tool having a cylindrical portion, a handle having a pair of clamping jaws with a plurality of radially arranged, opposed cavities therein, each set of opposed cavities being adapted to grip said cylindrical portion when the jaws are closed, and means to close the jaws.

3. A dental instrument comprising a tool having a cylindrical portion, an enlargement at the end adjacent the cylindrical portion, a handle having a pair of clamping jaws with substantially parallel, circular, opposed gripping faces adapted to engage said cylindrical portion therebetween and opposed cavities adapted to receive said enlargement, and means to close the jaws.

4. A dental instrument comprising a tool having a cylindrical portion, an enlargement at the end adjacent the cylindrical portion, a handle having a pair of clamping jaws with substantially parallel, circular, opposed gripping faces having a plurality of radially extending opposed cavities adapted to engage said cylindrical portion therebetween and opposed cavities adapted to receive said enlargement, and means to close the jaws.

THOMAS W. ONDERDONK.